United States Patent [19]

Rodrigue

[11] 4,044,790

[45] Aug. 30, 1977

[54] SELF RE-ARMING VALVE

[75] Inventor: Normand N. Rodrigue, Long Beach, Calif.

[73] Assignee: McDonnell Douglas Corporation, Long Beach, Calif.

[21] Appl. No.: 690,543

[22] Filed: May 27, 1976

[51] Int. Cl.² .................................. F16K 17/04
[52] U.S. Cl. ................................................ 137/465
[58] Field of Search ............................ 137/465; 91/5

[56] References Cited

U.S. PATENT DOCUMENTS

| 410,001 | 8/1889 | McClure | 137/465 |
| 942,042 | 11/1909 | Petley | 137/465 |
| 1,097,095 | 5/1914 | Henry | 137/465 X |
| 1,272,913 | 7/1918 | Burrows | 137/465 |
| 1,553,806 | 9/1925 | Econopouly | 137/465 |

FOREIGN PATENT DOCUMENTS

| 91,169 | 7/1922 | Austria | 137/465 |

Primary Examiner—Robert G. Nilson
Attorney, Agent, or Firm—John P. Scholl; Walter J. Jason; Donald L. Royer

[57] ABSTRACT

A dump valve which automatically closes (re-arms) when the system pressure reaches a predetermined level.

2 Claims, 6 Drawing Figures

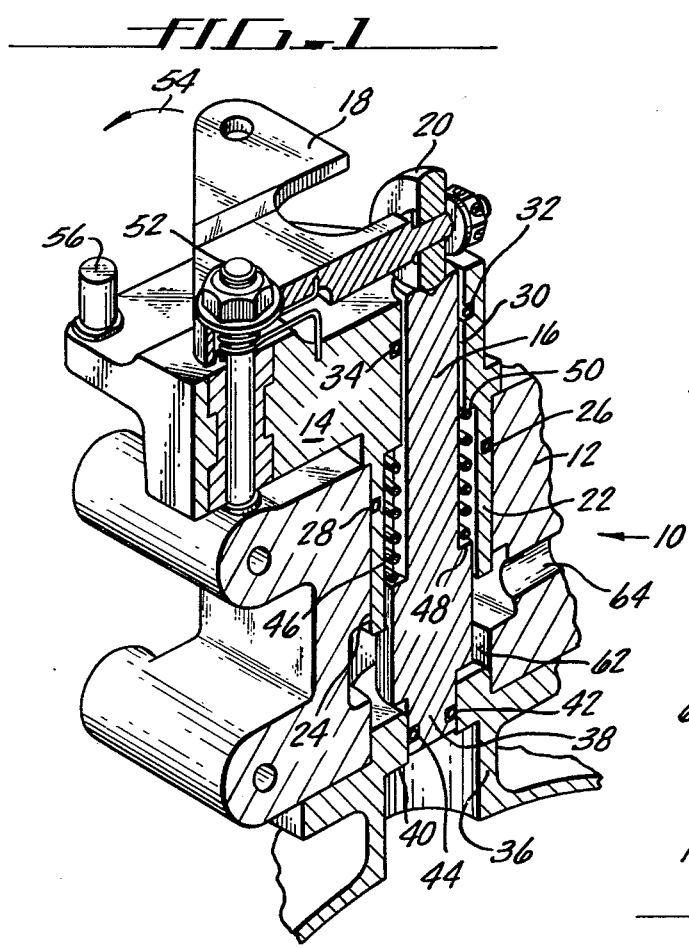
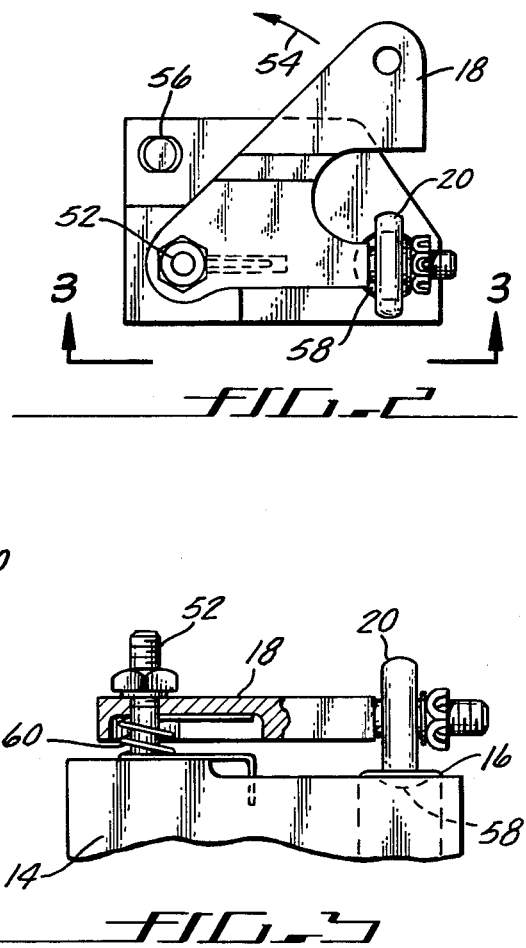
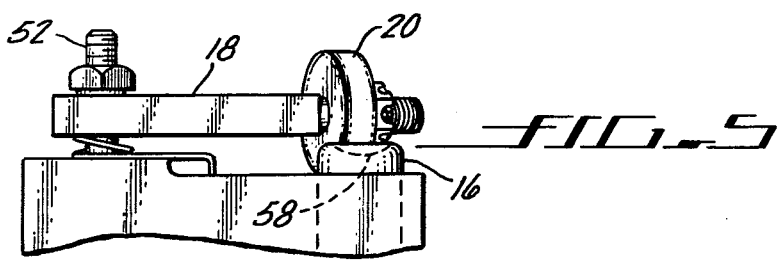
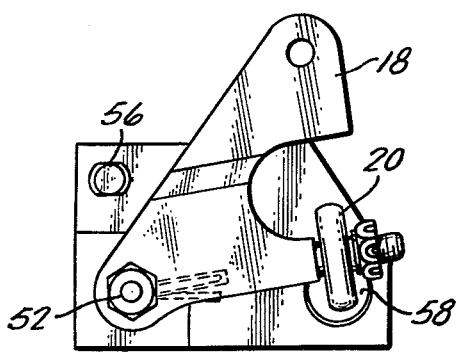
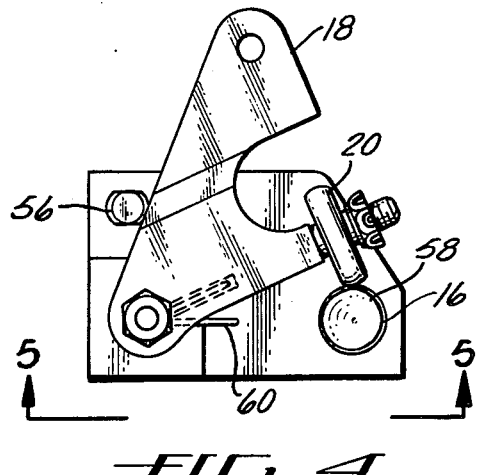

SELF RE-ARMING VALVE

BACKGROUND OF THE PRESENT INVENTION

Dump valves have been constructed so as to be spring-loaded to the closed position. In operation, this valve must be held open to permit the passage of the system fluid. A second type of dump valve which is not spring-loaded is opened by rotation. Although this valve need not be held open to permit passage of the system fluid, it must be manually closed before the system is re-pressurized.

In commercial aircraft many standby systems are operated by air or hydraulic pressure. In one system, a dump valve is used to release air under approximately 3000 psi pressure from a cylinder to operate an air motor to open the passenger exit doors. Due to the conditions under pressure the standby system is used to open the passenger exit doors, it is desirable to have the dump valve open and remain open until the system is substantially exhausted without the need for a crew member to hold the dump valve open. Accordingly, the second type of dump valve has been employed to release the air under pressure to operate the passenger exit doors. As described above, the dump valves are opened and remain open without further effort on the crew member's part. When the valve is to be closed and the system is to be recharged, the valve must be manually re-cycled (closed). In commercial aircraft the standby systems and valves are placed behind decorative paneling. It is expensive and time-consuming to remove the panels and re-arm the dump valve. To avoid the necessity of removing the paneling and re-arming the dump valve, it is desirable that the valve automatically close (re-cycle) so all that is necessary is to recharge the air to 3000 psi in the cylinder.

SUMMARY OF THE PRESENT INVENTION

An object of the present invention is to provide a dump valve which, when opened, will remain open until the system pressure is substantially exhausted and then automatically re-arm (close and lock).

A second object of the present invention is to provide a dump valve which becomes more stable and resistive to accidental discharge in the closed position as the operative system pressure builds.

The inventive dump valve opens when a follower is removed from the end of the valve stem. The released valve stem is forced to the open position by the system pressure on the valve piston permitting the flow of the system fluid through the dump valve.

A valve stem is spring-biased toward the closed position and when the system pressure reaches a predetermined level, the valve stem and piston move to the closed position. A return spring rotates a follower over the valve stem holding the valve stem and piston in the closed position as the system pressure is recharged. A detent on the valve stem co-acts with the follower and as the system pressure builds up exerts a positive force to center the follower on the valve stem to prevent accidental discharge of the system.

BRIEF DESCRIPTION OF THE DRAWINGS

FIG. 1 is a perspective vertical sectional view through the inventive valve;

FIG. 2 is a plan view of the follower arm and roller follower centered over the valve stem;

FIG. 3 is an enlarged partial elevational view along the line 3—3 of FIG. 2 with a portion of the follower arm broken away to expose the location of the return spring. The roller follower is in a position on the valve stem preventing discharge of the system;

FIG. 4 is a plan view of the follower arm rotated to permit opening of the dump valve;

FIG. 5 is an enlarged vertical view of the follower arm, the roller follower and the valve stem of FIG. 4 along the line 5—5. The valve stem is in the raised or open position; and FIG. 6 is a plan view of the follower arm, the roller follower and the valve stem. The roller follower is located approximately over the valve stem.

DETAILED DESCRIPTION OF THE PREFERRED EMBODIMENT

The inventive valve 10 (FIG. 1) contains a mounting block 12, a valve block 14, a valve stem 16, a follower arm 18, and a roller follower 20. a downward directed cylindrical collar 22 located on the valve block 14 is inserted into and mates with a hole 24 in the mounting block 12.

A first annular groove 26 is cut on the outside of the cylindrical collar 22. A first O-ring 28 is located in the first annular groove 26 and seals the cylindrical collar 22 in the hole 24 in the mounting block 12. The valve block 14 and the mounting block 12 are held together by bolts (not shown).

A cylindrical hole 30 is located on the axis of the cylindrical collar 22 and extends through the valve block 14. Positioned in this hole 30 is valve stem 16. A second annular groove 32 is cut in the wall defining hole 30 located in the valve block 14. The valve stem 16 is sealed in the valve block by a second O-ring 34 located in the second annular groove 32.

The mounting block 12 is attached to the top of an air storage cylinder 36 (which is shown in part) by bolts, not shown. The mounting block 12 is positioned on the top of the cylinder 36 so that a piston 38 located on the end of the valve stem 16 will protrude into the exhaust port 40 of the air storage cylinder 36.

Surrounding the piston 38 is a third annular groove 42 which contains a third O-ring 44. The third O-ring 44 seals piston 38 in port 40 when the valve is closed and prevents leakage of air from the cylinder 36. A helical spring 46 surrounds valve stem 16 and one end abuts a flange 48 on valve stem 16. The opposite end of the spring 46 abuts a shoulder 50 in hole 30 in the valve block 14. The compressive force of the spring 46 biases valve stem 16 is a downward direction (FIG. 1) and piston 38 into port 40.

Follower arm 18 is mounted for rotational movement on top of valve block 14 by bolt 52. Follower arm rotates in an arc as shown by arrow 54 (FIG. 2). The rotation of follower arm 18 is limited by stop pin 56. Follower roller 20 is rotationally mounted on follower arm 18.

In the top of valve stem 16 is a detent (cam) 58. Follower roller 20 is designed to overlay valve stem 16 and center itself in detent 58 (FIG. 2).

A return spring 60 surrounds bolt 52 and is embedded in holes located in follower arm 18 and valve block 14 (FIG. 3). Return spring 60 centers roller follower 20 approximately over detent 58 in valve stem 16 (FIGS. 2 and 6).

When follower arm 18 is rotated counterclockwise against pin 56 as shown in FIG. 4 and FIG. 5, piston 38 on valve stem 16 is forced out of port 40 by the system pressure of the air storage cylinder 36 (FIG. 1).

The air in storage cylinder 36 passes into chamber 62 in the mounting block and out passageway 64 to wherever the air is needed. As the air pressure in cylinder 36 decreases below a predetermined level, helical spring 46 forces piston 38 into port 40. When valve stem 16 is below the level of follower roller 20, return spring centers follower roller approximately over valve stem 16 (FIG. 6).

When the air pressure builds up in the storage cylinder 36, roller follower 20 centers over valve stem 16 and prevents discharge of the system by keeping piston 38 in port 40. As the air pressure in storage cylinder 36 increases, the centering force resulting from the coaction of the detent 58 and the roller follower 20 increases the stability of the valve and assists in preventing accidental discharge of the valve through vibration or inadvertent force on follower arm 18.

In operation, follower arm 18 is rotated counterclockwise against pin 56 (FIG. 4) and valve stem 18 is released. Piston 38 is forced out of port 40 by the air pressure in cylinder 36 (FIG. 5). As the air in cylinder 36 is exhausted through chamber 62 and out passageway 64 and the pressure on the bottom of piston 38 drops below 300 psi, helical spring 46 forces piston 38 into port 40 and closes valve 10. Return spring rotates follower arm 18 clockwise and positions roller follower 20 over valve stem 16 (FIG. 6). As the pressure is built up in air storage cylinder 36, the force on piston 38 pushes it in an upward direction (FIG. 1) and the action of roller follower 20 on detent 58 tends to center and hold roller follower over valve stem 16.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, since various other obvious modifications may occur to persons having ordinary skill in the art.

What is claimed is:

1. A self re-arming dump valve for use in controlling a pressurized fluid comprising:

a valve port, a valve piston, means for guiding said piston into said port, a spring for biasing said piston into said port, means for holding said piston from being forced out of said port by the pressurized fluid and for releasing said piston to permit opening of said valve by said fluid comprising a valve stem attached to said piston on the side opposite of the pressurized fluid, a roller follower to engage said valve stem and a spring to position said follower into engagement with said valve stem, and means for stabilizing said valve with said piston in said port comprising a detent in the end of the valve stem that is not attached to said piston, to co-act with said roller follower.

2. A mechanism for controlling the flow of pressurized fluid through a valve port comprising:

a valve piston sized to close the valve port, a valve stem attached to the piston on the side opposite of the pressurized fluid, a mounting block to surround said stem and guide said piston into said port, a spring for biasing said piston into said port, a roller follower to overlie said valve stem and hold said piston in the port against the force of the pressurized fluid, means for stabilizing the mechanism in a position wherein said valve piston is in the valve port, said means including a detent in the end of the valve stem not attached to the piston to co-act with said roller follower to center the follower over the valve stem.

* * * * *